Oct. 7, 1924.                                                   1,510,882
                          J. BROGDEN
                            PULLEY
                     Filed March 2, 1923
FIG. I.                                      FIG. II.
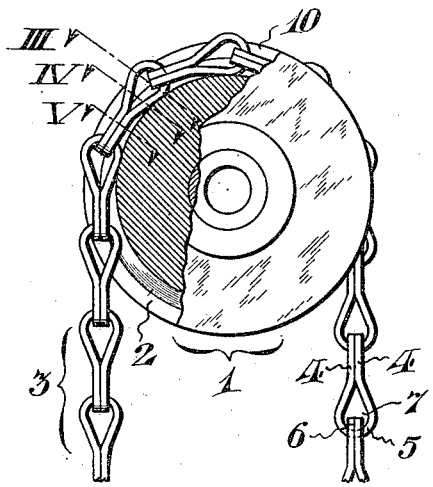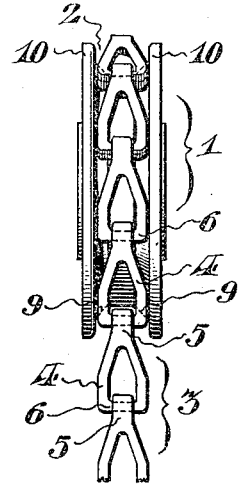
FIG. III.
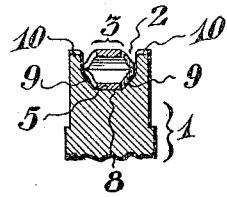
FIG. IV.                                     FIG. V.
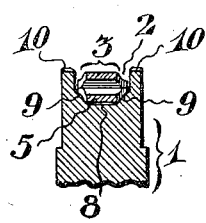                         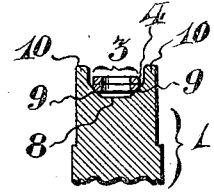
WITNESSES:                                   INVENTOR:
                                             Joah Brogden,
                                         BY
                                                    ATTORNEYS.

Patented Oct. 7, 1924.

1,510,882

UNITED STATES PATENT OFFICE.

JOAH BROGDEN, OF MELROSE PARK, PENNSYLVANIA, ASSIGNOR TO DAVID LUPTON'S SONS COMPANY, OF PHILADELPHIA, PENNSYLVANIA, A CORPORATION OF PENNSYLVANIA.

PULLEY.

Application filed March 2, 1923. Serial No. 622,255.

*To all whom it may concern:*

Be it known that I, JOAH BROGDEN, a citizen of the United States, residing at Melrose Park, county of Montgomery, and State of Pennsylvania, have invented certain new and useful Improvements in Pulleys, of which the following is a specification, reference being had to the accompanying drawings.

My invention relates to pulleys and more especially to chain pulleys useful in connection with the hanging of window sashes.

The chains ordinarily employed for this purpose are made up of links of sheet metal which are apt to stretch and become flattened as a result of running about the pulley under pull of the sash weights. The main object of my invention is to offset or prevent this tendency to the advantage of absolute pivotal freedom between the links and to obviate necessity for frequent adjustment to compensate for the lengthening due to stretching.

This desideratum I secure by provision of a pulley structure affording bearing for all points of the chain links as they round the pulley.

Other objects and attendant advantages will become apparent from the detailed description which follows of a typical embodiment of my invention; while its scope will be as readily deductible from the appended claims.

In the drawings, Figure I is an illustration of my improved pulley and an associated sash chain, the pulley being mostly in face view, but with a portion thereof broken away and in section to better show the positions of the chain links in the pulley groove.

Figure II is a side elevation in edge view of the organization depicted in Figure I; and Figures III, IV and V are detail sectional views taken as indicated by the arrows III—IV and V, respectively in Figure I, showing how the cross sectional configuration of the peripheral pulley groove affords bearing for all points of the chain links.

In the organization herein represented, the pulley is comprehensively designated by the numeral 1, it having a peripheral groove 2 for the guidance of a sash chain 3 as is usual in such structures. Said chain, it will be noted, is of the kind ordinarily accepted as standard for sash hanging, its links being of sheet metal bent to the form best shown in Figure I from blanks each comprising a pair of similar open loops 4 or lobes (Figure II) integrally joined by an intermediate section or band 5 toward which the lobes or loops are attenuated. Assemblage of the links of such a chain is maintained as a result of projecting one of the lobes or loops of a blank through the loop openings of an adjacent link and bringing the same into superposed relation upon its counterpart by bending incidental to manufacture, the transverse end portions 6 of the superposed loops of one link being thus held in pivotal embrace within the bights 7 formed by retroversion of the intermediate band 5 of the adjacent link. A chain of this sort, by virtue of its construction as above noted, invariably becomes flattened by frequent running about a pulley of ordinary construction, such flattening being accompanied by lengthening of the chain as a whole. This has in the past given rise to considerable trouble in requiring frequent readjustment of the chains for length, besides greatly impairing pivotal freedom of the links. This difficulty I overcame by so configuring the peripheral chain groove 2 of the pulley that support or bearing is afforded all points of the links as they pass about the same. The cross sectional configuration or profile of the groove is clearly represented in Figure III from which it will be observed that there is provided a comparatively flat tread 8 for bearing of the narrower portions 5 of the links, and flanking outwardly divergent slopes 9—9 which merge with the retaining flanges 10—10 at the sides of the pulley. These flanking slopes 9—9 are slightly concaved as indicated so that opposite edges of the gradually widening portions of the links may in their turn be positively supported as suggested in the successive sectional views of Figures IV and V, thereby affording bearing for the links throughout their lengths so that the strain is evenly distributed and not confined almost wholly to the pivot bights of the links as has heretofore invariably been the case.

Having thus described my invention, I claim:

1. In combination, a chain embodying links each of which consists of a pair of attenuated lobes integrally joined by an intermediate fold-over section, and a pulley formed with a flat tread and flaring sides, whereby the links of said chain are afforded bearing throughout their length.

2. The combination with a chain embodying links each of which consists of a pair of attenuated lobes integrally joined by an intermediate fold-over section, of a pulley having a peripheral groove formed with a substantially flat continuous tread and flanking inclined outwardly divergent slopes merging into the peripheral side flanges of said pulley.

In testimony whereof, I have hereunto signed my name at Philadelphia, Pennsylvania, this 24th day of February, 1923.

JOAH BROGDEN.

Witnesses:
JAMES H. BELL,
E. L. FULLERTON.